(12) United States Patent
Smith

(10) Patent No.: US 10,087,666 B2
(45) Date of Patent: Oct. 2, 2018

(54) ADJUSTABLE HANGAR HINGE

(71) Applicant: CENTOR DESIGN PTY LTD, Eagle Farm (AU)

(72) Inventor: Michael Smith, Hamilton (AU)

(73) Assignee: CENTOR DESIGN PTY. LTD., Queensland (AU)

( * ) Notice: Subject to any disclaimer, the term of this patent is extended or adjusted under 35 U.S.C. 154(b) by 332 days.

(21) Appl. No.: 14/436,784

(22) PCT Filed: Oct. 16, 2013

(86) PCT No.: PCT/AU2013/001199
§ 371 (c)(1),
(2) Date: Apr. 17, 2015

(87) PCT Pub. No.: WO2014/059477
PCT Pub. Date: Apr. 24, 2014

(65) Prior Publication Data
US 2015/0368949 A1     Dec. 24, 2015

(30) Foreign Application Priority Data

Oct. 17, 2012   (AU) .................................. 2012904538

(51) Int. Cl.
*E05D 15/16*     (2006.01)
*E05D 11/10*     (2006.01)
(Continued)

(52) U.S. Cl.
CPC ............ *E05D 11/1007* (2013.01); *E05D 3/02* (2013.01); *E05D 11/10* (2013.01);
(Continued)

(58) Field of Classification Search
CPC . E05D 11/1007; E05D 11/10; E05D 15/0639; E05D 15/26; E05D 7/0423;
(Continued)

(56) References Cited

U.S. PATENT DOCUMENTS

| | | | |
|---|---|---|---|
| 1,060,641 A * | 5/1913 | Sladden | E05D 11/00 16/349 |
| 6,618,900 B2 * | 9/2003 | Spork | E05D 11/1007 16/102 |

(Continued)

FOREIGN PATENT DOCUMENTS

GB      2402192 A  * 12/2004   ......... E05D 15/0634

*Primary Examiner* — Victor D Batson
*Assistant Examiner* — Matthew J Sullivan
(74) *Attorney, Agent, or Firm* — McNees Wallace & Nurick LLC

(57) ABSTRACT

A hanger hinge for a folding door, window or similar closure having one or more panels, the hanger hinge comprising: A hanger bolt having a receiving portion in a lower end thereof adapted to receive at least a portion of an adjusting tool; A sleeve adapted to be supported on the lower end of the hanger bolt; At least one hinge leaf pivotally mounted on the hanger bolt and adapted to be fixed to a respective panel; and A locking mechanism comprising a locking member movable axially between a locked condition in which the locking member is engaged with the sleeve in a manner to substantially preclude rotation of the hanger bolt relative to the sleeve, and an unlocked condition in which the locking member is disengaged from the sleeve by axial insertion of the adjusting tool into the receiving portion, thereby freeing the hanger bolt for rotation relative to the sleeve.

20 Claims, 12 Drawing Sheets

(51) Int. Cl.
*E05D 15/06* (2006.01)
*E05D 15/26* (2006.01)
*F16B 39/32* (2006.01)
*E05D 3/02* (2006.01)
*F16B 39/06* (2006.01)
*E05D 7/04* (2006.01)
*F16B 19/02* (2006.01)
*F16B 35/04* (2006.01)

(52) U.S. Cl.
CPC ......... *E05D 15/0639* (2013.01); *E05D 15/26* (2013.01); *F16B 39/32* (2013.01); *E05D 7/0423* (2013.01); *E05Y 2201/244* (2013.01); *E05Y 2201/246* (2013.01); *E05Y 2201/474* (2013.01); *E05Y 2600/14* (2013.01); *F16B 19/02* (2013.01); *F16B 35/048* (2013.01); *F16B 39/06* (2013.01); *Y10T 16/5407* (2015.01); *Y10T 16/540247* (2015.01)

(58) Field of Classification Search
CPC ......... Y10T 16/5407; Y10T 16/540247; E05Y 2201/244; F16B 39/32; F16B 39/06
See application file for complete search history.

(56) References Cited

U.S. PATENT DOCUMENTS

| | | | |
|---|---|---|---|
| 8,661,618 B2* | 3/2014 | Jablonski | E05D 11/1007 16/320 |
| 8,677,564 B2* | 3/2014 | Pelekanos | E05D 15/26 16/105 |
| 2011/0107555 A1* | 5/2011 | Buchanan | E05D 7/0045 16/237 |
| 2013/0061427 A1* | 3/2013 | Lang | E05D 7/0423 16/248 |

* cited by examiner

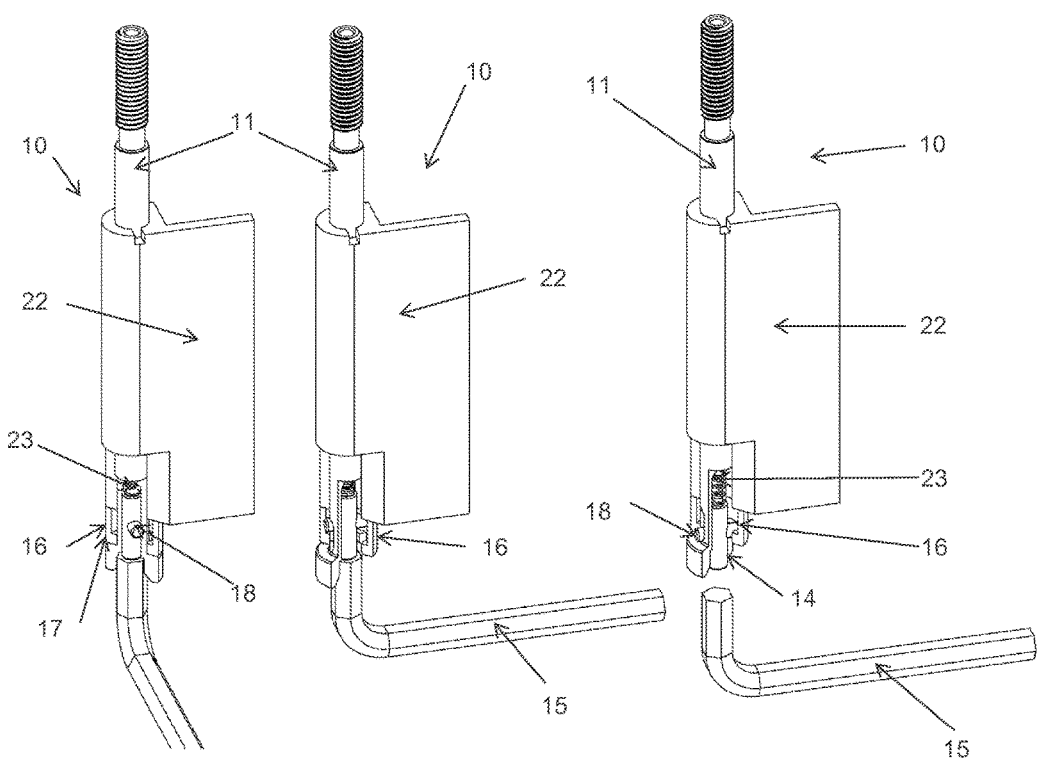

FIG 8A                    FIG 8B

ADJUSTABLE HANGAR HINGE

TECHNICAL FIELD

The present invention relates to an adjustable hanger hinge. In particular, the present invention relates to an adjustable hanger hinge for a folding door, window or similar closure.

BACKGROUND ART

A hanger hinge is used to suspend a hinged panel, or a pair of hinged panels, from an overhead horizontal track while permitting the panels to pivot about a vertical binge axis. Typically, the panels are panels of a folding door, window or similar closure. If die hanger hinge is used to suspend the end panel of a series of panels, it normally has one hinge leaf fixed to that panel. If the hanger hinge is an intermediate hanger used to suspend a pair of adjacent panels, it has a pair of hinge leaves, each fixed to a respective one of the pair of adjacent panels.

Throughout this specification, where the context permits, the term "panel" is intended to refer to a generally planar closure component of a folding door, window, shutter, screen or like closure. The invention will be described with, particular reference to its application to panels of a folding door, but the scope of the invention is not limited thereto.

Typically, each hanger hinge (except the hanger hinge nearest the jamb) depends from a respective wheeled carriage which rides along the track. The combination of each hanger hinge and its carriage forms a carrier hinge assembly. An example of a known carrier hinge assembly is illustrated in our Australian Patent No. 726943.

A hanger hinge typically comprises an upright hanger bolt which serves as a hinge pin for the hinge leaf or leaves pivotally mounted thereon. The bottom end of the bolt is threaded to receive a nut thereon. The hinge leaves, which are axially slideable along the hanger bolt, rest upon the nut and are supported thereon. The position of the nut on the hanger bolt therefore determines the position of the hinge leaves relative to both the hanger bolt and the track from which the hanger bolt is suspended. Since the hinge leaves are fixed to the panels in use, the height of the panels can be adjusted by rotating the nut to vary its position along the threaded end of the hanger bolt.

Height adjustment of the panels is usually required from time to time to correct out-of-square movements of the panels and to prevent the door panels from sticking, or otherwise to facilitate smooth movement of the door panels. It is important to ensure that once the hanger hinge has been properly adjusted, it does not lose its adjustment, i.e. that there is no undue rotation of the height-adjusting nut, It has been found that with conventional hanger hinges, repeated opening and closing of the panels can result in rotation of the nut, and hence loss of adjustment.

Hitherto, a second (locking) nut has been used on the hanger bolt to lock the height-adjusting nut in position. However, such locking nut arrangements are not always effective. Two spanners are usually required to adjust the height of the panels, and due to the positioning of the nuts in close proximity to the panels, damage may be caused to the panels through spanner slippage. Moreover, the nuts are not aesthetically pleasing, Our U.S. Pat. No. 6,618,900 discloses a lockable carrier hinge assembly in which height adjustment is achieved by threading the hanger bolt into the carriage. The hanger bolt has a fixed, nut or head at its bottom end. Once adjusted, the hanger boil is locked, to a hinge leaf, to prevent relative rotation therebetween.

Although the lockable carrier hinge assembly of U.S. Pat. No. 6,618,900 has been found to be satisfactory for roost commercial and residential applications, it may not be the optimum design for suspending large and heavy door panels.

If Some further attempts have been made to provide an adjustable hanger hinge arrangement. For instance, in our Australian patent no, 2004202218, a mechanism is provided whereby the rotation of a nut relative to a sleeve allows for the adjustment of the height of the hanger hinge relative to a panel or panels. While the operation of this device may be simple arid result in an automatic locking of the adjustment height, the mechanism requires a large diameter and a long housing, which is both unsightly and complex to manufacture.

Thus, there would be an advantage if it were possible to provide an adjustable banger hinge that was quick and simple to adjust, that, reduced or eliminated unwanted movement of the mechanism between adjustments and that was compact and cost effective.

It will be clearly understood that, if a prior art publication is referred to herein, this reference does not constitute an admission that the publication, forms part of the common general knowledge in the art in Australia or in any other country.

SUMMARY OF INVENTION

The present invention in directed to an adjustable hanger hinge which may at least partially overcome at least one of the abovementioned disadvantages or provide the consumer with a useful or commercial choice.

With the foregoing in view, the present invention in one form, resides broadly in a hanger hinge for a folding door, window or similar closure having one or more panels, the hanger hinge comprising:

A hanger bolt having a receiving portion hi a lower end thereof adapted to receive at least a portion of an adjusting tool;

A sleeve adapted to be supported cm the lower end of the hanger bolt;

At least one hinge leaf pivotally mounted on. the hanger bolt and adapted to be fixed to a respective panel; and A locking mechanism comprising a locking member movable axially between a locked condition in which the locking member is engaged with the sleeve in a manner to substantially preclude rotation of the banger bolt relative to the sleeve, and an unlocked condition in which the locking member is disengaged from the sleeve by axial insertion of the adjusting tool into the receiving portion, thereby freeing the hanger bolt for rotation relative to the sleeve.

Although the present invention may be described largely in terms of folding doors and folding windows, it will be understood that, the present invention may be used with any suitable closure for an opening, such as but not limited to, a swinging or hinged door or window panel.

The hanger bolt may be of any suitable form. Preferably, however, the hanger bolt comprises an elongate member, an upper end of which may be adapted for engagement with a carrier (such as a wheeled carrier). It is envisaged that the carrier will be adapted to move along a track positioned at the head of the opening in which the panels are positioned. Preferably, the hanger bolt depends from she carrier in use.

The hanger bolt may be of any suitable length and diameter, and a skilled addressee will understand that the exact dimensions of the hanger bolt will be dependent on the location in which the hanger hinge is to be used, the size and weight of the panels to be supported, the type of panels to be supported, the size of the hinge leaf (or leaves) required and so on.

The hanger bolt may be adapted for engagement with the carrier using any suitable technique. Preferably, however, the hanger bolt is engaged with the carrier in such a manner that the position of the hanger bolt relative to the carrier may be adjusted. Thus, in a preferred embodiment of the invention, the hanger bolt may be adapted for screw-threaded engagement with the carrier. To achieve this, the upper end of the hanger bolt may be provided with an external screw thread adapted to be received in a screw-threaded recess in the carrier. Alternatively, the hanger bolt may be provided with a screw-threaded recess in which an externally screw-threaded portion of the carrier is received.

The hinge leaf may be of any suitable size, shape or configuration, and a skilled addressee will understand that the configuration of the hinge leaf will vary depending on (amongst other factors) the nature of the panel to which it is to be attached. Thus, the exact configuration of the hinge leaf is not critical to the present invention.

It is envisaged that the hinge leaf or hinge leaves will be connected to a knuckle portion. Preferably the knuckle portion comprises a substantially tabular member that is adapted to be located over the hanger bolt so that the hanger bolt passes through the tubular member. Preferably, the length of the knuckle portion is less than that of the hanger bolt, so that a portion of the hanger bolt protrudes from at least one end of the knuckle portion. In some embodiments of the invention, the knuckle portion forms the sleeve.

In one embodiment of the invention in which a pair of hinge leaves is provided, it is envisaged that the hinge leaves may have interleaved knuckle portions, each having a bore therethrough dimensioned to receive the hanger bolt in a close sliding fit.

This, in some embodiments of the invention (such as where the knuckle portion forms the sleeve), the sleeve and the hinge leaf may be formed integrally with one another, Alternatively, the sleeve and the hinge lead may be formed separately from one another. In this embodiment of the invention it is preferred, that the sleeve may be located at a lower position on the hanger bolt, and the hinge leaf is located, in use, above the sleeve.

As previously stated, the lower end of the hanger bolt includes a receiving portion adapted to receive at least a portion of an adjusting tool. In a preferred embodiment of the invention, the receiving portion includes a bore that extends into the hanger bolt and into which the adjusting tool is at least partially inserted. Preferably, the bore extends ax tally into the hanger bolt along at least a portion of the length of the hanger bolt. Thus, in this embodiment of the invention, the receiving portion is located on a lower surface of the hanger bolt and extends upwardly into the hanger bolt.

The adjusting tool may be of any suitable form. For instance, the adjusting tool may be a screwdriver or similar tool. Alternatively, the adjusting tool may comprise any suitable item that may he inserted into the receiving portion, such as a pen or pencil.

In some embodiments of the invention, the receiving portion may be shaped so as to receive only a certain type of adjusting tool. For instance, the receiving portion (or, more specifically, the bore) may be square, hexagonal, octagonal, an irregular shape and so on in cross-section, so that only an adjusting tool of a particular shape is capable of being used, in this way, damage to the adjustment mechanism may be reduced by preventing a user from using an unsuitable tool as an adjustment tool.

In a preferred embodiment of the invention, the adjusting tool may be an Allen key, The sleeve may be of any suitable size, shape or configuration. In a preferred embodiment of the invention, however, the sleeve comprises a substantially tubular member, ft is envisaged that, in use, the hanger bolt will pass through the sleeve, so that the sleeve will cover at least a portion of the outer surface of the hanger bolt. It is envisaged that the sleeve will be retained in a close sliding fit on the hanger bolt. Preferably, the length of the sleeve is less than that of the hanger bolt, so that a portion of the hanger bolt extends outwardly from one or both ends of the sleeve. Preferably, the sleeve is substantially circular in cross-section.

Preferably, the sleeve comprises locking means adapted to engage with the locking member in the locked condition, thereby preventing rotation of the hanger bolt relative to the sleeve. Any suitable locking means may be used.

In a preferred embodiment, however, the locking means may comprise one or more projections adapted to engage with the locking member in the locked condition, so as to prevent rotation of the locking member (and therefor the hanger bolt) relative to the sleeve.

The one or more projections may be located in any suitable position on the sleeve. In a preferred embodiment of the invention, however, the one or more projections may be located on an inner surface of the sleeve, and may extend inwardly towards the hanger bolt from the inner surface of the sleeve. In this embodiment, a plurality of projections may be provided spaced around the inner surface of the sleeve. The exact spacing of the projections is not critical, although it will be understood that the greater the number of projections provided, the less movement there will be between the sleeve and the hanger bolt in the locked condition. It is envisaged that, in a preferred embodiment, a minimum of two projections will be provided. Thus, it will be understood that, in some embodiments of the invention, the one or more projections may be located on an inner surface of the knuckle portion, the knuckle portion forming the sleeve.

It will be understood that, when in the locked condition, some minor rotation of the hanger bolt maybe possible, as the locking member rotates between adjacent projections. The actual degree of rotation allowed will be dependent on the size and location of the projections, as well as the size of the locking member. It is preferred that the minor rotation of the hanger bolt be minimised, meaning that, in a preferred embodiment of the invention, a minimum of four projections may be provided. In this way, the rotation of the hanger bolt while in the locked condition is less than 90° (a quarter turn) in either direction.

As previously stated, the sleeve is adapted to be supported on the lower end of the hanger bolt. This may be achieved using any suitable technique, although the sleeve will not be fixedly attached to the hanger bolt, as the hanger bolt is adapted to rotate relative to the sleeve when in the unlocked condition.

In some embodiments, the lower end of the hanger bolt maybe provided with one or more retention members on which the sleeve is retained during use. The one or more retention members may be of any suitable form, and may include one or more projections, lands, flanges, lips or the like (or any suitable combination thereof) on which the sleeve may be retained. Alternatively, the sleeve may be received in a recess or channel etc.

In a preferred embodiment of the invention, a single retention member is present. In some embodiments, the retention member may comprise a region of increased diameter compared to the remainder of the hanger bolt. In this embodiment of the invention, the diameter of the sleeve will be larger than the diameter of the main portion of the hanger bolt, but will be smaller than (or substantially the same as) the diameter of the region of increased diameter.

Preferably, the region of increased diameter is located at or adjacent the lower end of the hanger bolt. In a particular embodiment, the region of increased diameter comprises the lowermost portion of the hanger bolt, and the receiving portion is located on a lower surface of the region of increased diameter.

When assembling the hanger hinge, it is envisaged that the sleeve will, be placed over the upper end of the hanger bolt. The sleeve will be retained on the hanger bolt by a lower end of the sleeve abutting an upper surface of the one or more retention members, In a preferred embodiment, the sleeve and the at least one hinge leaf may be adapted to engage one another in the assembled hanger hinge, so as to prevent rotation of the sleeve and the hinge leaf independently of one another. The sleeve and the hinge leaf may engage using any suitable technique. For instance, the sleeve and the hinge leaf may be held in screw-threaded engagement with one another. Alternatively, the sleeve and/or the hinge leaf may be provided with one or more engagement members adapted to retain the sleeve and the hinge leaf in engagement with, one another during use.

In some embodiments, the engagement members of the sleeve may comprise one or more projections adapted, to be received in one or more corresponding recesses on a knuckle portion of the hinge leaf. Alternatively, the engagement members of the knuckle portion of the hinge leaf may comprise one or more projections adapted to be received, in one or more corresponding recess in the sleeve. In another embodiment, each of the sleeve and the knuckle portion of the hinge leaf comprise one or more projections and one or more recesses adapted for engagement with one another.

In some embodiments of the invention, the sleeve and the hinge leaf may be formed as a single integral unit, such as when the knuckle portion forms the sleeve.

The locking mechanism may be of any suitable form, in a basic embodiment of the invention, the locking member may comprise a locking member (for instance, in the form of a bar) that is held in abutment with, the projections on the inner surface of the sleeve in the locked condition, in this embodiment of the invention, the adjusting tool abuts the locking member when it is inserted into the receiving portion and moves it ax tally upwards relative to the sleeve.

It is envisaged that, the locking member may be moved, any suitable distance. However, in a preferred embodiment of the invention, the locking member is moved at least to a level above the projections on the inner surface of the sleeve. In this way, rotation of the hanger bolt relative to the sleeve (to adjust the vertical height of the panel or panels relative to the carrier) may be achieved, as the locking member can rotate without abutting the one or more projections on the inner surface of the sleeve, Rotation of the hanger bolt in the unlocked condition is achieved by rotating the adjusting tool relative to the sleeve.

When the height of the one or more panels has been adjusted to the desired level, the adjusting tool may be removed from the receiving portion. When this occurs, the locking member moves axially downwards into the locked condition, thereby preventing substantial further rotation of the hanger bolt relative to the sleeve.

In some embodiments, the removal of the adjusting tool may not necessarily return the locking member directly to the locked condition, for instance if the locking member moves axially downwardly and abuts an upper surface of the one or more projections on the inner surface of the sleeve. However, in this situation, even a small movement of the panels (e.g. when opening or shutting the door or window) will result in a small rotation of the hanger bolt relative to the sleeve, and the locking member will move out of abutment with the upper surface of the projections and return to the locked condition, thereby preventing further rotation of the hanger bolt relative to the sleeve.

Preferably, the locking mechanism further comprises one or more biasing members. It is envisaged that the role of the biasing member(s) will be to bias the locking member substantially into the locked condition once the adjustment tool has been withdrawn from the receiving portion. Any suitable biasing members) may be used, although in a preferred embodiment of the invention, the biasing member(s) comprises one or more springs.

In embodiments of the invention in which the biasing member comprises one or more springs, it is envisaged that moving the locking member from the locked condition to the unlocked condition will involve overcoming the natural bias of the one or more springs. This is achieved by a user applying a force through the adjusting tool to the biasing member to overcome its natural, bias. When the adjusting tool is withdrawn from the receiving portion, the natural bias of the one or more springs moves the locking member axially downwards into the locked condition.

In some embodiments of the invention, the locking member may return to the locked condition under the effects of gravity once the adjustment tool has been removed from the receiving portion.

In other embodiment of the invention, the locking member may be retained in screw-threaded engagement with the sleeve. Thus, the locking member may be provided with an external screw thread, while the sleeve may be provided with a complementary internal screw thread along at least a portion of its length. In this embodiment of the invention, adjustment of the locking member may be achieved by adjusting the position of the locking member relative to the internal screw thread of the sleeve.

In another embodiment of the invention, the locking mechanism may further comprise a tool engaging member. It is envisaged that the adjusting tool will engage an end of the tool engaging member upon insertion into the receiving portion. Preferably, the opposite end of the tool engaging member may be in abutment with the biasing member, such that an upward axial movement of the tool engaging member compresses the biasing member. In this embodiment, it is preferred that the locking member may be associated with the tool engaging member, such that axial movement of the tool engaging member results in a corresponding axial movement of the locking member. The tool engaging member and the locking member may be formed integrally with one another, or may be formed separately from one another and adapted for fixed or temporary engagement therewith.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information, for those skilled in the art to perform the invention. The Detailed Description is not to be regarded as limiting the scope of the preceding Summary of the Invention in any way. The Detailed Description will make reference to a number of drawings as follows:

FIGS. 4A to 4E illustrate steps in the adjustment of a hanger hinge according to an embodiment of the present invention.

DESCRIPTION OF EMBODIMENTS

Figure 1:
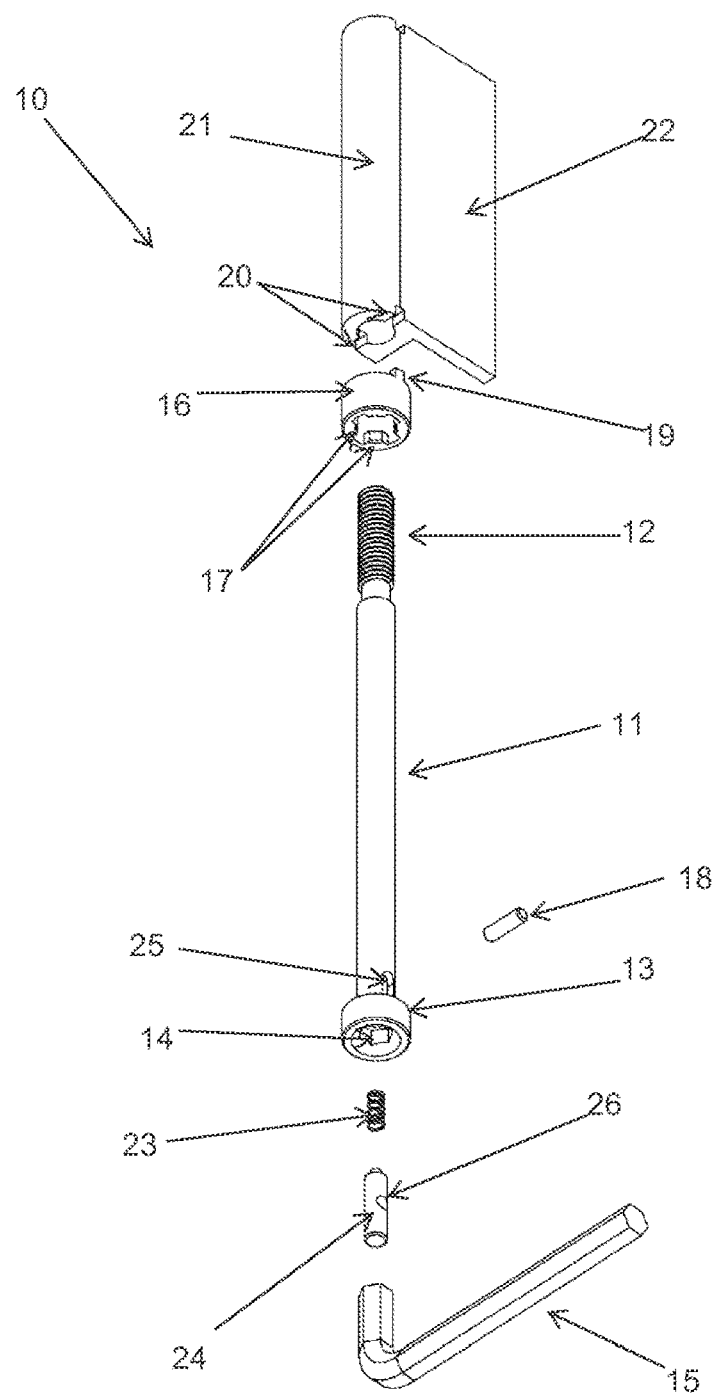
FIG. 1 illustrates an exploded view of a hanger hinge according to an embodiment of the present invention.

In FIG. 1 there is illustrated an exploded view of a hanger hinge 10 according to an embodiment of the present invention. The hanger hinge 10 comprises a hanger bolt 11 having a screw-threaded upper end 12 adapted for engagement with a carrier (not shown), and a lower end comprising a region of increased diameter 13 relative to the remainder of the hanger bolt 11. A receiving portion 14 is located in the underside of the hanger bolt 11, the receiving portion adapted to receive an adjusting tool in the form of an Allen key 15.

The hanger hinge 10 further comprises a sleeve 16 adapted to slide over the hanger bolt 11. The sleeve 16 is retained on the hanger bolt 11 through its abutment with the region of increased diameter 13 at the lower end of the hanger bolt 11.

The inner surface of the sleeve 16 is provided with projections 17, including abutment surfaces 17a and 17b, against which the locking members 18 abuts when the hanger hinge 10 is in the locked condition, thereby preventing rotation of the hanger bolt 11 relative to the sleeve 16. The sleeve is also provided with engagement members 19 adapted to be received in corresponding recesses 20 in the knuckle portion 21 of the hinge leaf 22 so as to prevent rotation of the sleeve 16 and the hinge leaf 22 independently of one another.

The locking mechanism is assembled by first inserting a spring 23 and a tool engaging member 24 into the receiving portion 14. The locking member 18 is passed through an aperture 25 in the surface of the hanger bolt 11 and a corresponding aperture 26 in the tool engaging member 24.

When in use, adjustment of the hanger hinge 10 is achieved, by inserting the Allen key 15 into the receiving portion 14 so that it abuts the tool engaging member 24. Applying an upward force moves the tool engaging member 24 axially upwardly, overcoming the natural, bias of the spring 23.

The locking member 18 is moved upwardly to a point above the projections 17 (the unlocked condition). It is when the locking member 18 is in this position that rotation of the hanger bolt 11 (achieved through rotation of the adjusting cool 15) relative to the sleeve 16 is possible. Rotation of the hanger bolt 11 causes an adjustment in the screw threaded engagement between the hanger bolt 11 and the carrier (not shown), thereby adjusting the height of the hinge leaf 22 (and therefore the panel (not shown) to which the hinge leaf 22 is attached) relative to the carrier (not shown).

In FIGS. 2A to 2D there are shown steps in the adjustment of a hanger hinge 10 according to an embodiment of the present invention.

Figures 2A, 2B:
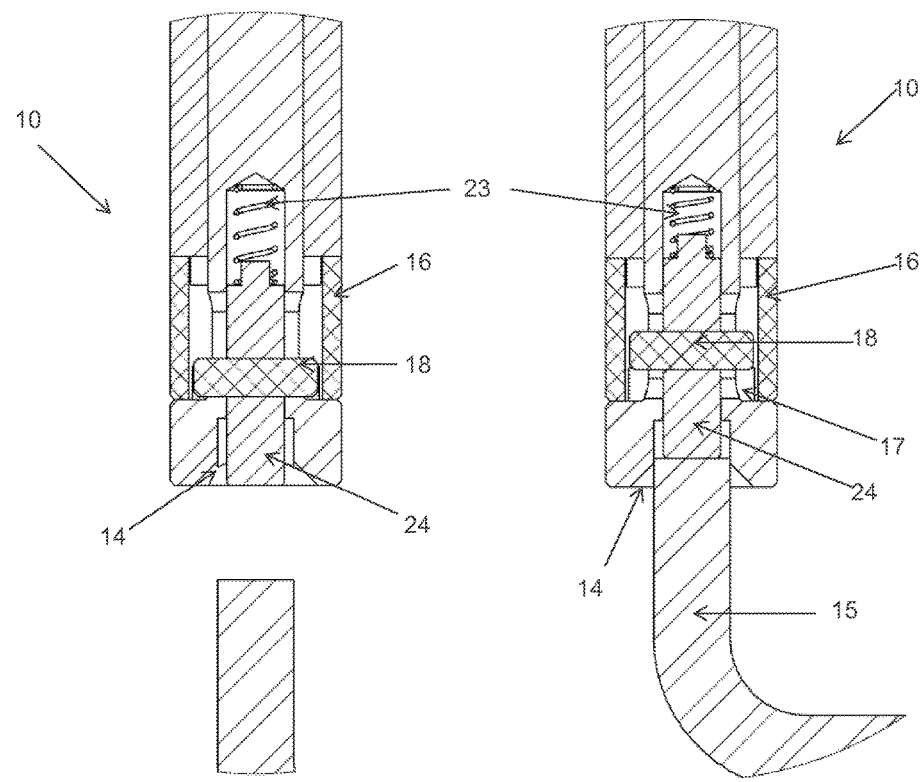
FIGS. 2A to 2D illustrate steps in the adjustment of a hanger hinge according to an embodiment of the present invention.

In FIG. 2A, the hanger hinge 10 is shown in the locked condition. The locking member 18 is prevented from rotation relative to the sleeve 16 due to its abutment with the projections (obscured). The natural bias of the spring 23 ensures that the location of the tool engaging member 24 is maintained in the receiving portion 14.

In FIG. 2B, the Allen key 15 is inserted into the receiving portion 14 and an axial force is applied to the tool engaging member 24 that overcomes the natural bias of the spring 23, and moving the locking mechanism in an axial direction.

This axial movement begins to lift the locking member 18 axially upwardly to a point above the projections 17 on the inner surface of the sleeve 16.

Figures 2C, 2D:
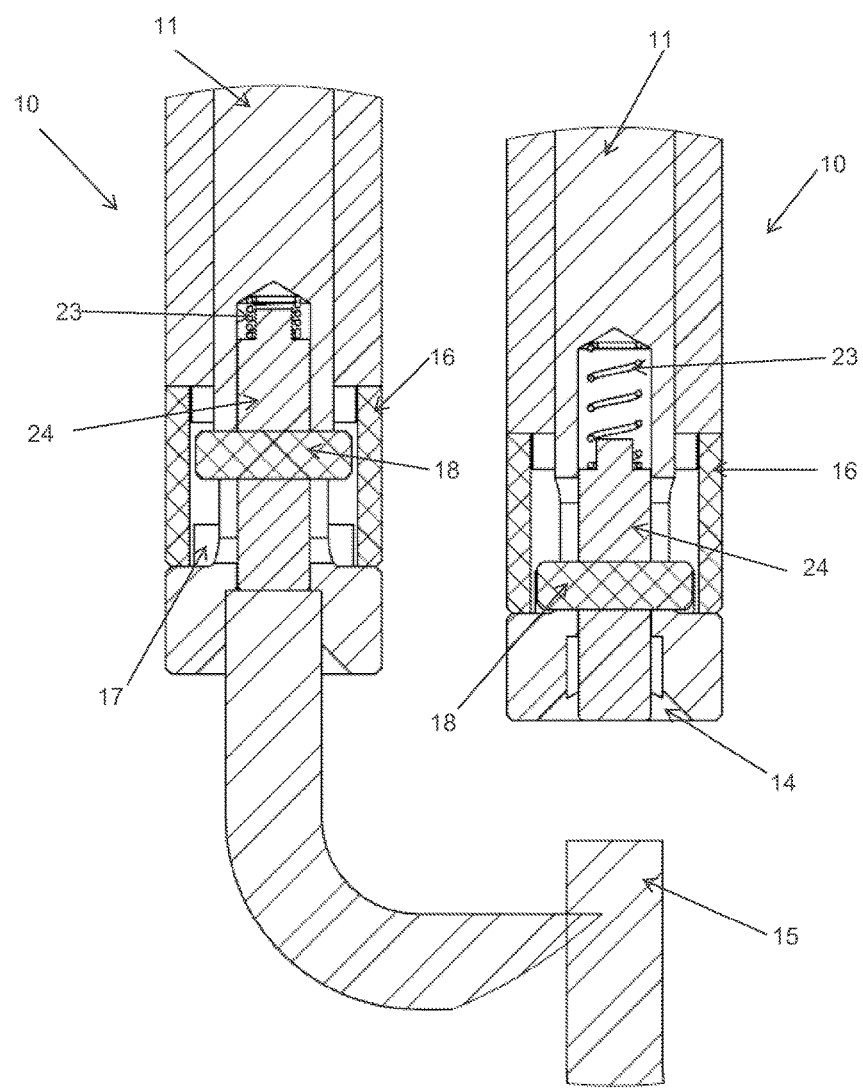

FIG. 2C illustrates the hanger hinge 10 in the unlocked condition. In this Figure, the limit of axial movement of the tool engaging member 24 has been reached and the spring 23 has been compressed. The locking member 18 has been lifted to a height above the projections 17, meaning that the hanger bolt 11 is now freed for rotation relative to the sleeve 16. In this way, the position of the hanger bolt 11 relative to the carrier (not shown) can be adjusted.

Once the desired adjustment to the position of the hanger bolt 11 has been made, the Allen key 15 is removed from the receiving portion 14, as shown in FIG. 2D. The natural bias of the spring 23 ensures that the tool engaging member 24 moves axially downwards, thereby returning the locking mechanism to the locked condition in which the locking member 18 is precluded from rotation relative to the sleeve 16.

Figure 3A:
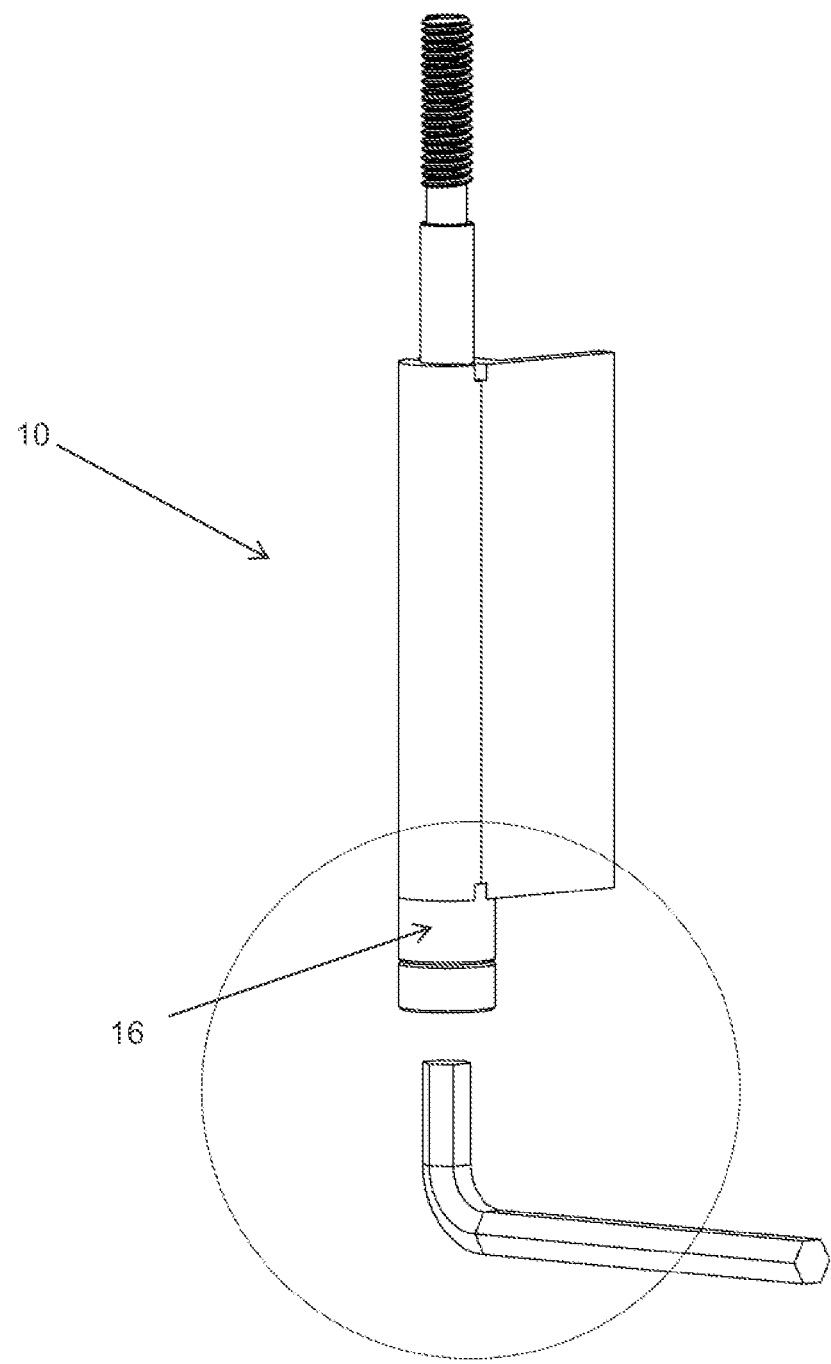
FIGS. 3A to 3B illustrate steps in the adjustment of a hanger hinge according to an embodiment of the present invention.
Figure 3B:
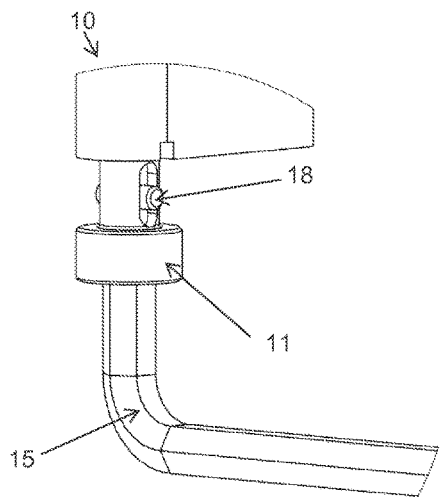

In FIG. 3A there is shown a hanger hinge 10 according to an embodiment of the invention. The hanger hinge 10 is in the locked condition, and FIGS. 3B to 3B illustrates steps in the in the adjustment of the hanger hinge 10. FIG. 3A includes a sleeve, which, for the sake of clarity, has been omitted from FIGS. 3B to 3E. The circled area of FIG. 3A is shown in FIGS. 3B to 3E.

In FIG. 3B, the Allen key 15 is inserted into the receiving portion (obscured) of the hanger bolt 11, and a force is applied to create an upward axial movement of the locking mechanism, including the locking member 18.

Figure 3C:
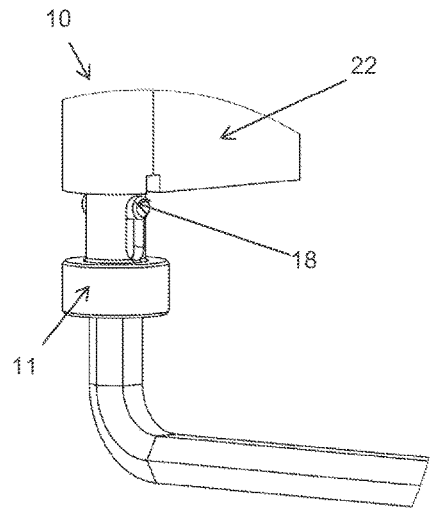

In FIG. 3C, the limit of the upward axial movement of the locking member 18 has been reached, and the hanger hinge 10 is now in the unlocked condition in which the hanger bolt 11 may be rotated relative to the sleeve (not shown) and the hinge leaf 22.

Figure 3D:
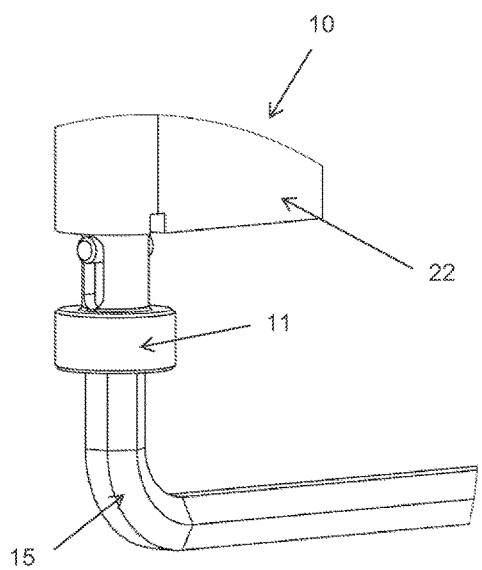
Figure 3E:
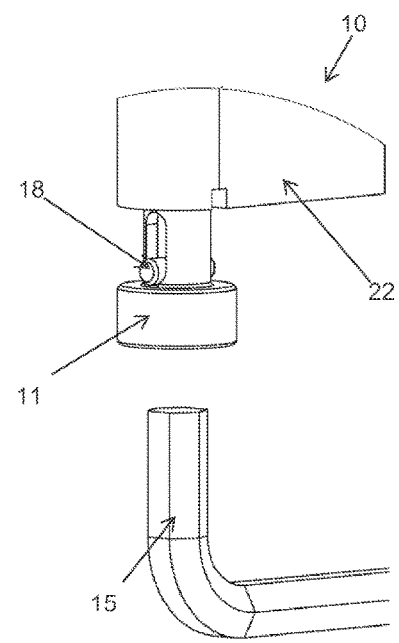

In FIG. 3D, rotation of the Allen key 15 results in rotation of the hanger bolt 11 relative to the hinge leaf 22. In this way, the position (e.g. the vertical location) of the hanger bolt 11 relative to the hinge leaf 22 maybe adjusted.

In FIG. 3B, the hanger hinge 10 is returned to the locked condition after adjustment. This is achieved by withdrawing the Allen key 15 from the receiving portion (obscured), thereby causing a downward axial movement of the locking mechanism (including the locking member 18). In this position, the hanger bolt 11 is once again precluded from rotation relative to the hinge leaf 22.

Figures 4A, 4B:
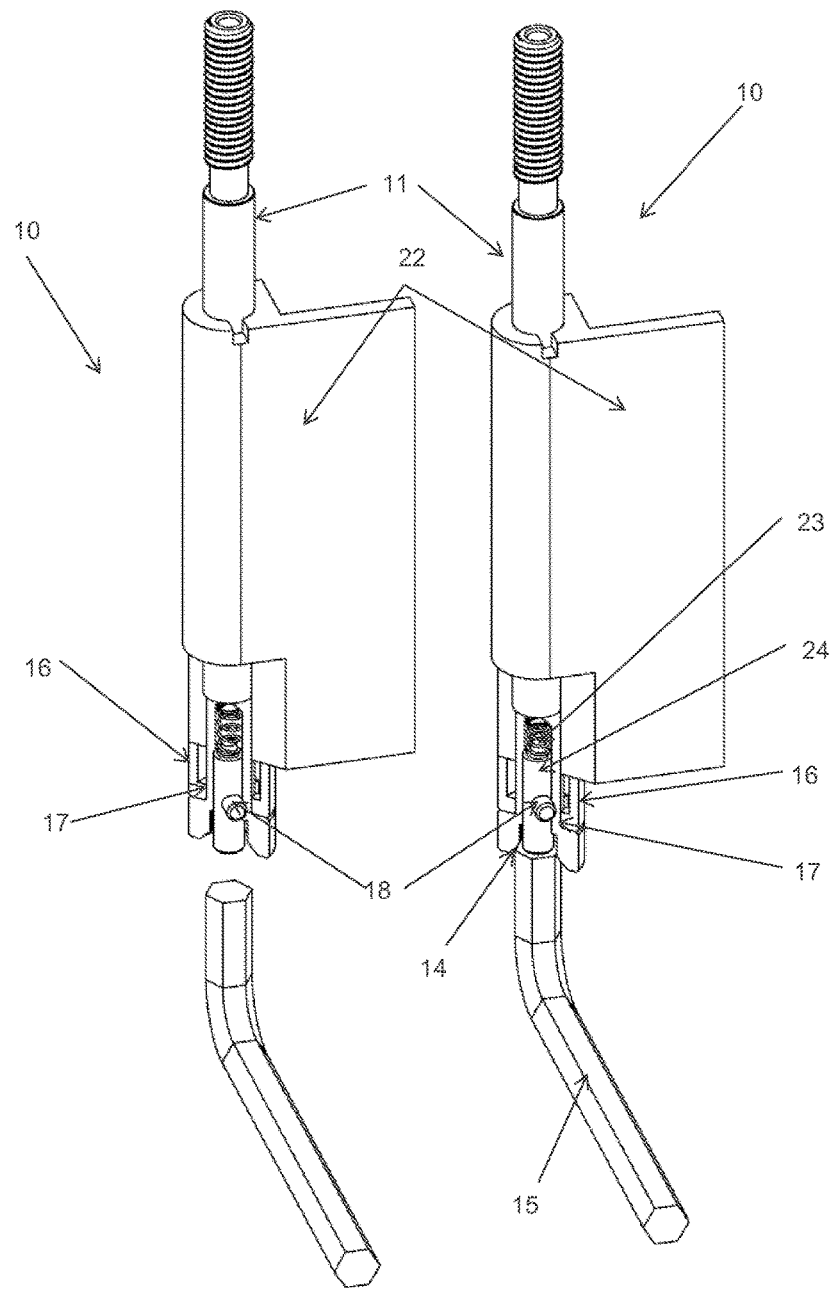

In FIGS. 4A to 4E, steps in the adjustment of a hanger hinge 10 according to an embodiment of the present invention are shown, The steps in the adjustment of the hanger hinge 10 are essentially the same as those shown in FIGS. 3A to 3E, however the hanger hinge 10 in FIGS. 4A to 4B is shown in partial cross-section so as to illustrate the mechanism by which the hanger hinge 10 may be adjusted.

In FIG. 4A, the hanger hinge 10 is shown in the locked condition in which the hanger bolt 11 is prevented from rotating relative to the sleeve 16 and the hinge leaf 22. Rotation of the hanger bolt 11 is not possible due to the abutment of the locking member 18 with projections 17 located on the inner surface of the sleeve 16.

In FIG. 4B, an Allen key 15 is inserted into the receiving portion 14 of the hanger bolt 11, and a force is applied to the tool engaging member 24 to overcome the natural bias of spring 23, thereby creating an upward axial movement of the tool engaging member 24 and the locking member 18.

In FIG. 4C, the limit of the upward axial movement of the locking member 18 has been reached (i.e. the spring 23 is fully compressed), and the hanger hinge 10 is now in the unlocked condition in which the hanger bolt 11 may be rotated relative to the sleeve 16 and me hinge leaf 22. In the unlocked condition the locking member 18 is positioned at a vertical location above the projections 17, meaning that the locking member 18 may rotate freely without abutting the projections 17.

In FIG. 4D, rotation of the Allen key 15 results in rotation of the hanger bolt 11 relative to the hinge leaf 22 and the sleeve 16. In this way, the position (e.g. the vertical location) of the hanger bolt 11 relative to the hinge leaf 22 and sleeve 16 may be adjusted.

In FIG. 4E, the hanger hinge 10 is returned to the locked condition after adjustment. This is achieved by withdrawing the Allen key 15 from the receiving portion 14, thereby causing a downward axial movement of the tool engaging member 24 and the locking member 18. The downward movement of the tool engaging member is assisted by the natural bias of the spring 23. In this position, the hanger bolt 11 is once again precluded from rotation relative to the hinge leaf 22 and the sleeve 16.

It will be noted that, for some small ranges of rotation of the hanger bolt 11, upon removal of the Allen key 15, the locking member 18 will not immediately be returned to the locked condition under the natural bias of the spring 23. This is because the locking member 18 abuts one of the projection members 17 in sleeve 16. In such a case, the mechanism will remain unlocked until further rotation of the hanger boll occurs.

This further rotation may be caused by two possible actions. The first of these is that the person adjusting the mechanism applies a farther small rotation of the hanger bolt 11 but with the tool engaging member 24 not fully depressed by the Allen key 15 so that the locking member 18 is able to at least partially move between two adjacent projection members 17. The second possible action is that normal use of she door causes rotation to occur up to a point wherein the locking member 18 is able to automatically move under the natural bias of spring 23. This ability to automatically engage means that, if the person adjusting the mechanism is not diligent in ensuring the mechanism is locked, such locking will occur during future operation of the door, thereby preventing the door from corning out of adjustment.

Figures 5A, 5B:
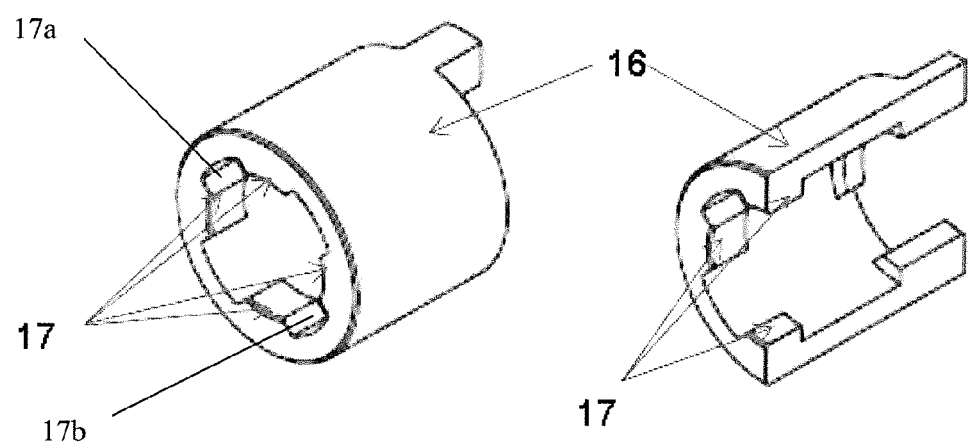
FIGS. 5A and 5B illustrate a sleeve according to an embodiment of the present invention.

In FIGS. 5A and 5B there are shown perspective views of the sleeve 16 according to an embodiment of the present invention. It may be seen in these Figures that the sleeve comprises four projections 17 located on the inner surface thereof, the projections being adapted to substantially prevent rotation of the hanger bolt (not shown) when the hanger hinge is in the locked condition. The presence of four projections 17 means that the hanger bolt (not shown) is prevented from rotating more than a quarter turn in either direction. Depending on the size of the locking member (not shown) and the projections, however, it is likely that the hanger bolt will only be able to rotate much less than a quarter turn in either direction.

Figure 6:
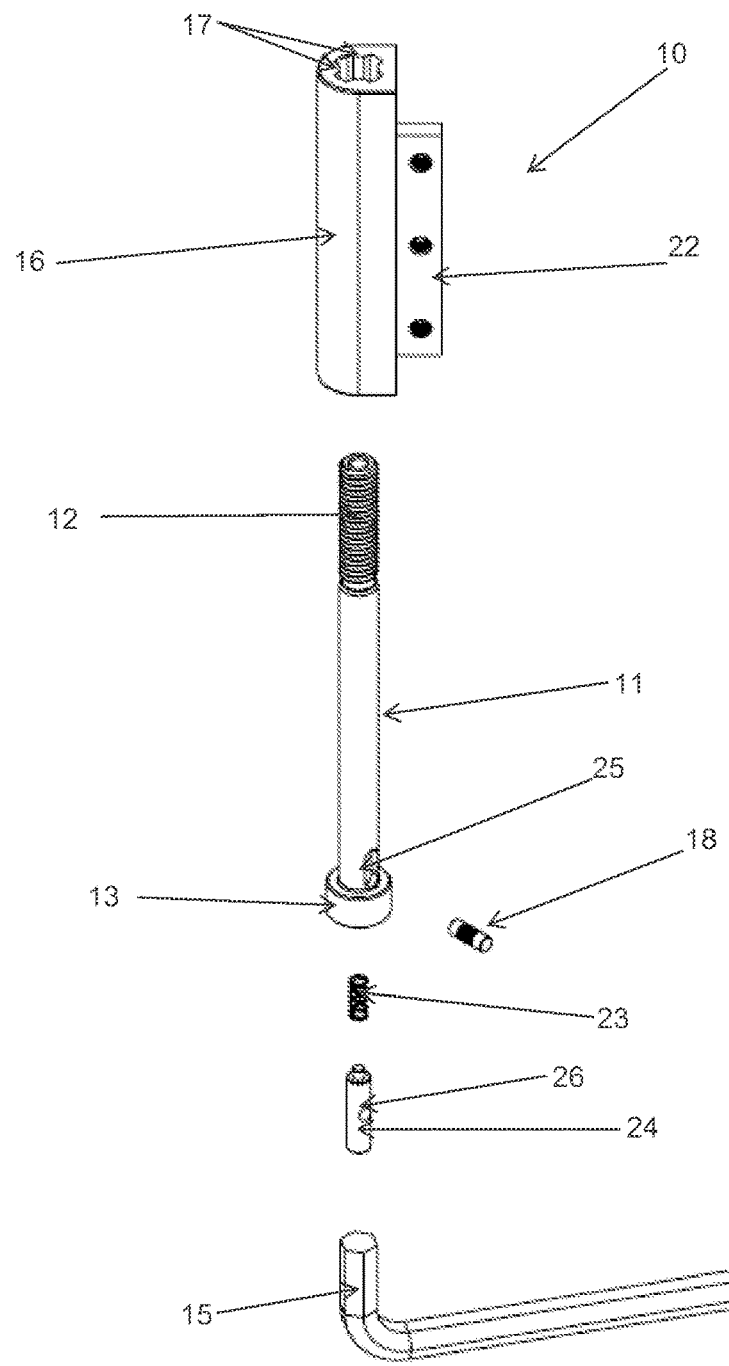
FIG. 6 illustrates an exploded view of a hanger hinge according to an alternative embodiment of the present invention.

In FIG. 6 there is illustrated an exploded view of a hanger hinge 10 according to an embodiment of the present invention. The hanger hinge 10 comprises a hanger bolt 11 having a screw-threaded upper end 12 adapted for engagement with a carrier (not shown), and a lower end comprising a region of increased diameter 13 relative to the remainder of the hanger bolt 11. A receiving portion (obscured) is located in the underside of the hanger bolt 11, the receiving portion adapted to receive an adjusting tool in the form of an Allen key 15.

The hanger hinge 10 further comprises a sleeve 16 in the form of the knuckle portion adapted to slide over the hanger bolt 11. The sleeve 16 is retained on the hanger bolt 11 through its abutment with the region of increased diameter 13 at the lower end of the hanger bolt 11.

The inner surface of the sleeve 16 is provided with projections 17 against which the locking member 18 abuts when the hanger hinge 10 is in the locked condition, thereby preventing rotation of the hanger bolt 11 relative to the sleeve 16.

The sleeve 16 is connected to a hinge leaf 22, the hinge leaf 22 being adapted for connection to a door panel (not shown).

The locking mechanism is assembled by first inserting a spring 23 and a tool engaging member 24 into the receiving portion 14. The locking member 18 is passed through an aperture 25 in the surface of the hanger bolt 11 and a corresponding aperture 26 in the tool engaging member 24.

When in use adjustment of the hanger hinge 10 is achieved by inserting the Allen key 15 into the receiving portion 14 so that it abuts the tool engaging member 24. Applying an upward force moves the tool engaging member 24 axially upwardly, overcoming the natural bias of the spring 23.

The locking member 18 is moved upwardly relative to the sleeve 16 to the unlocked condition. It is when the locking member 18 is in this position that rotation of the hanger bolt 11 (achieved through rotation of the adjusting tool 15) relative to the sleeve 16 is possible. Rotation of the hanger bolt 11 causes an adjustment in the screw-threaded engagement between the hanger bolt 15 and the carrier (not shown), thereby adjusting the height of the hinge leaf 22 (and therefore the panel (not shown) to which the hinge leaf 22 is attached) relative to the carrier (not shown).

Figure 7:
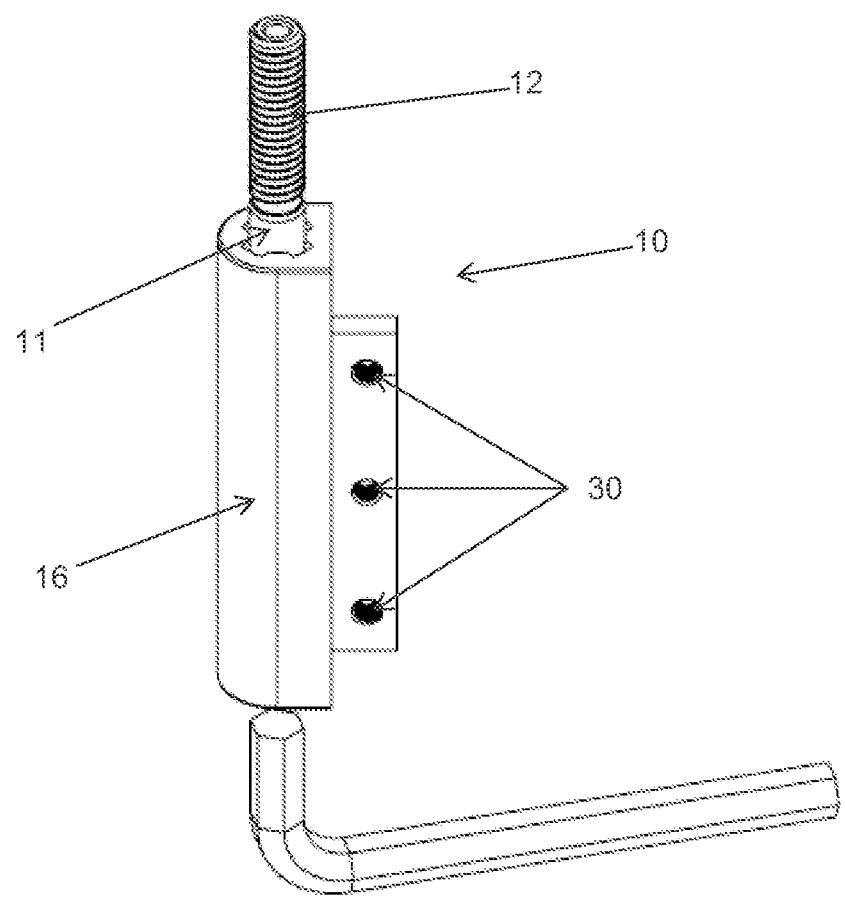
FIG. 7 illustrates art isometric view of a hanger hinge according to an alternative embodiment of the present invention.

In FIG. 7 there is shown an isometric view of a hanger hinge 10 according to an embodiment of the present invention. The hanger hinge 10 of FIG. 7 is the hanger hinge of FIG. 6 when in an assembled state.

In FIG. 7 it may be seen that the hanger bolt 11 passes through the bore in the sleeve 16 and the screw-threaded portion 12 of the hanger bolt 11 extends outwardly from an upper end of the sleeve 16 for connection to a carrier (not shown). The hinge leaf 22 is provided with a plurality of apertures 30 therethrough to facilitate attaching the hinge leaf 22 to a door panel (not shown) using fasteners (not shown).

Figure 8:
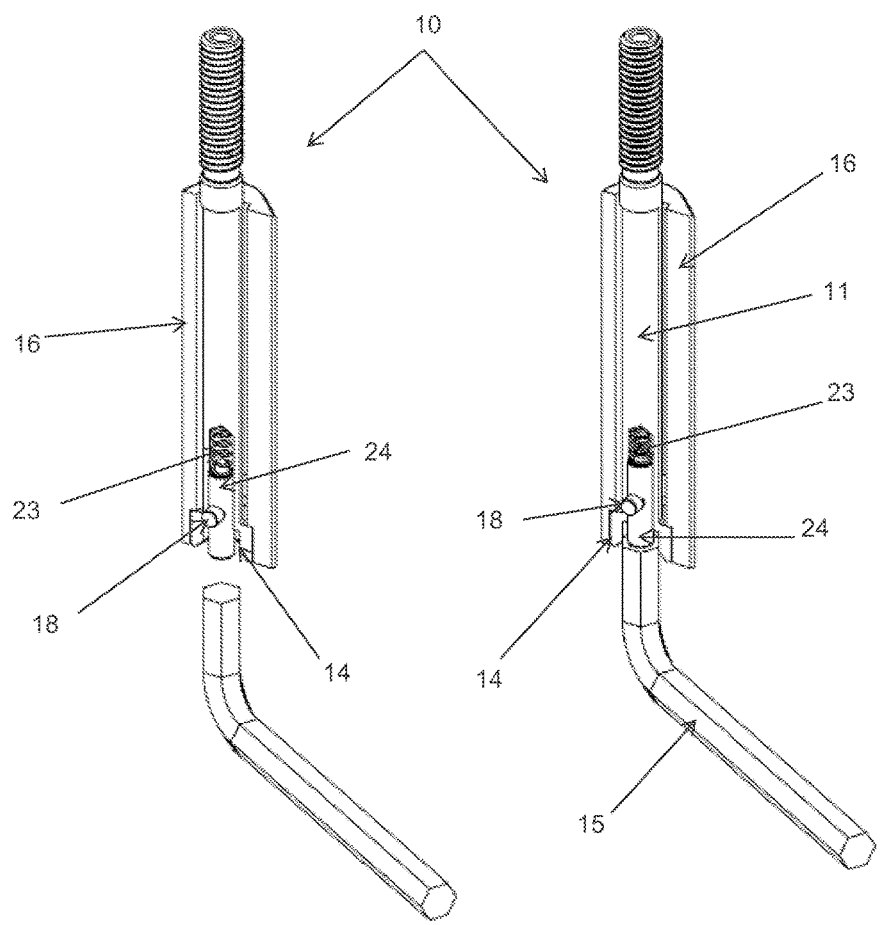
FIGS. 8A and 8B illustrate steps in the adjustment of a hanger hinge according to an embodiment of the present invention.

FIGS. 8A and SB illustrate steps in the adjustment of a hanger hinge 10 according to an embodiment of the present invention.

In FIG. 8A, the hanger hinge 10 is shown in the locked condition. The locking member 18 is prevented from rotation relative to the sleeve 16 due to its abutment with the projections (obscured). The natural bias of the spring 23 ensures that the location of the tool engaging member 24 is maintained in the receiving portion 14.

In FIG. 8B, the Allen key 15 is inserted into the receiving portion 14 and an axial force is applied to the tool engaging member 24 that overcomes the natural bias of the spring 23, and moving the locking mechanism in an axial direction.

This axial movement begins to lift the locking member 18 axially upwardly to a region within the sleeve 16 in which no projections (obscured) are present on the inner surface of the sleeve 16. This may be either because the locking member 18 is lifted axially above the projections (obscured), or the projections (obscured) are discontinuous, meaning that an annular region within the sleeve 16 is created in which no projections (obscured) are present, allowing for 360° rotation of the locking member 18 relative to the sleeve 16.

It will be noted that, for some small ranges of rotation of the hanger bolt 11, upon removal of the Allen key 15, the locking member 18 will not immediately be returned to the locked condition under the natural bias of the spring 23. This is because the locking member 18 abuts one of the projections (not shown in this Figure) in sleeve 16. In such a case, the mechanism will remain unlocked until further rotation of the hanger bolt 11 occurs. Upon this further rotation, the locking member 18 will be removed from its abutment with the projection (not shown in tins Figure), thereby allowing the locking member 18 to move into the locked condition under the bias of the spring 23.

The farther rotation of the hanger bolt 11 relative to the sleeve 16 may be achieved rising any suitable technique. For instance, a user may, after withdrawing the Allen key 15, be aware that the locking member 18 has not returned to the locked condition. Thus, the user may re-insert the Allen key 15 into the receiving portion 14 and provide the further rotation to the hanger bolt 11 so that the locking member 18 may be biased into the locked condition.

Alternatively, the further rotation may occur as a result of the use of the folding door or window (not shown) to which the hanger hinge 10 is connected. It is envisaged that, during the normal operation of the folding door or window (i.e. as the folding door or window is opened and closed through movement of the door or window panels) the movement of the door or window panels will cause rotation of the hanger bolt 11 relative to the sleeve 16. Thus, during use of the folding door or window, the locking member 18 will be removed from its abutment with the projection (not shown in this Figure), thereby allowing the locking member 18 to move into the locked condition under the bias of the spring 23.

Figure 9:
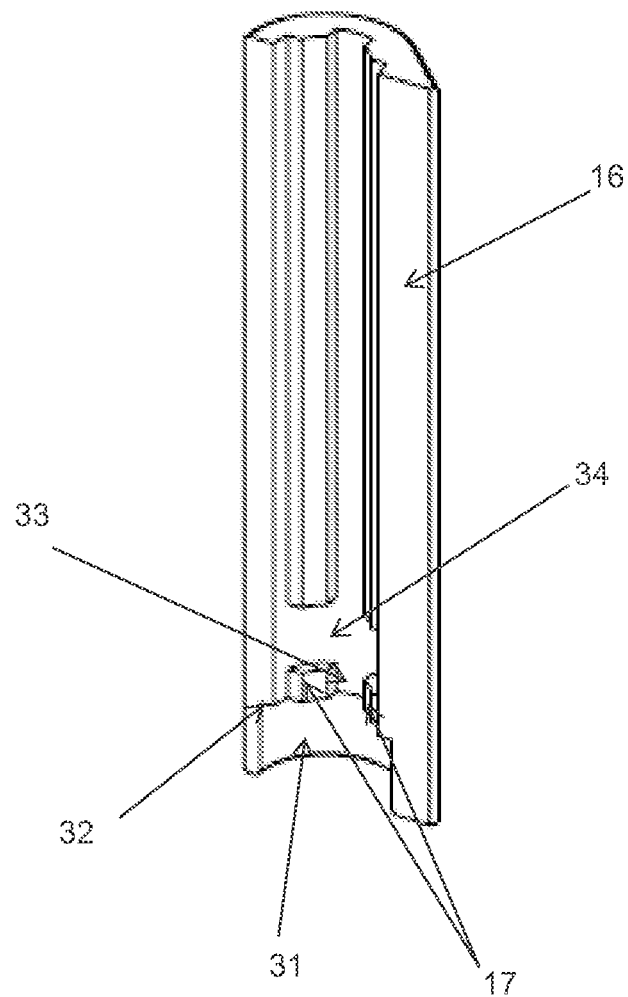
FIG. 9 illustrates a cross-sectional view of a sleeve according to an embodiment of the present invention.

In FIG. 9 there is shown a cross-sectional view of a sleeve 16 according to an embodiment of the present invention, In this Figure it may be seen that the diameter of the bore 31 at the lower end of the sleeve 16 is of a greater diameter than the bore 31 at the upper end of the sleeve. This change in diameter creates an annular shoulder 32 against which the region of increased diameter (not shown in this Figure) at the lower end of the hanger bolt (not shown in this Figure) abuts during use, thereby retaining the sleeve 16 on the hanger bolt (not shown in this Figure).

The inner surface of the sleeve 16 is provided with projections 17. In the locked condition, the locking member (not shown in this Figure) is oriented such that a portion of the locking member is located in the channel or gap 33 between adjacent projections 17. Thus, the rotation of the locking member relative to the sleeve 16 is substantially prevented through the abutment of the locking member and the projections if a rotational force is provided to the locking member.

In order to free the locking member, and therefore the hanger bolt (not shown in this Figure), for rotation relative to the sleeve 16, the locking member is moved axially upwardly within the sleeve 16 until it is located in the region 34 on the inner surface of the sleeve 36 in which no projections 17 are located. When the locking member is positioned in this region 34, the locking member (and therefore the hanger bolt) is freed for rotation relative to the sleeve 16.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is therefore, claimed in any of its forms or modifications within the proper scope of the appended claims (if any) appropriately interpreted by those skilled in the art.

The invention claimed is:

1. A hanger hinge for a folding door, window or similar closure having one or more panels, the hanger hinge comprising:
   a. a hanger bolt having a receiving portion in a lower end thereof configured to receive at least a portion of an adjusting tool;
   b. at least one hinge leaf pivotally mounted on the hanger bolt and configured to be fixed to a respective panel;
   c. a sleeve mounted and moveable relative to the hanger bolt, the sleeve provided at and configured to be supported on the lower end of the hanger bolt and, including one or more internal abutment surfaces; and d. a locking mechanism having a locked condition and a temporarily unlocked condition, the locking mechanism mounted and moveable relative to the tool engaging member and comprising:
 i. a tool engaging member located concentrically within a portion of the hanger bolt and biased into a locked position relative to the sleeve; and
 ii. a locking member mounted relative to the tool engaging member and moveable therewith,
the tool engaging member and the locking member movable axially relative to the sleeve between the locked position in which the locking member is engaged with the one or more internal abutment surfaces of the sleeve in a manner to substantially preclude rotation of the hanger bolt relative to the sleeve, and an unlocked position in which the locking member is disengaged from the one or more internal abutment surfaces of the sleeve, thereby freeing the hanger bolt for rotation relative to the sleeve.

2. The hanger hinge of claim 1, wherein the hanger bolt comprises an elongate member having an upper end adapted for engagement with a carrier.

3. The hanger hinge of claim 2, wherein the upper end of the hanger bolt is adapted for screw-threaded engagement with the carrier.

4. The hanger hinge of claim 1, wherein the at least one hinge leaf is connected to a knuckle portion comprising a substantially tubular member configured to be located over the hanger bolt.

5. The hanger hinge of claim 1, wherein the receiving portion is located on a lower surface of the hanger bolt and extends upwardly into the hanger bolt.

6. The hanger hinge of claim 1, wherein the receiving portion is shaped so as to receive only a certain type of adjusting tool.

7. The hanger hinge of claim 1, wherein the hanger bolt passes through the sleeve such that the sleeve covers at least a portion of an outer surface of the hanger bolt.

8. The hanger hinge of claim 1, wherein the sleeve comprises locking means configured to engage with the locking member in the locked condition.

9. The hanger hinge of claim 8, wherein the locking means comprises one or more projections configured to engage with the locking member in the locked condition.

10. The hanger hinge of claim 1, wherein the lower end of the hanger bolt is provided with one or more retention members on which the sleeve is retained during use.

11. The hanger hinge of claim 1, wherein the sleeve and the at least one hinge leaf are configured to directly engage with one another to prevent rotation of the sleeve and the at least one hinge leaf independently of one another.

12. The hanger hinge of claim 1, wherein the adjusting tool abuts the locking member when the adjusting tool is inserted into the receiving portion, thereby moving the locking member axially upwards relative to the sleeve.

13. The hanger hinge of claim 1, wherein the locking mechanism further comprises one or more biasing members configured to bias the locking member into the locked condition once the adjusting tool has been withdrawn from the receiving portion.

14. The hanger hinge of claim 13, wherein following the withdrawal of the adjusting tool from the receiving portion, further rotation of the hanger bolt relative to the sleeve is required before the locking member is biased into the locked condition by the one or more biasing members.

15. The hanger hinge of claim 14, wherein the further rotation of the hanger bolt relative to the sleeve occurs as a result of the use of the folding door or window.

16. The hanger hinge of claim 13, wherein the one or more biasing members comprise one or more springs.

17. The hanger hinge of claim 1, wherein the locking mechanism further comprises a tool engaging member.

18. The hanger hinge of claim 17 wherein the adjusting tool engages an end of the tool engaging member upon insertion into the receiving portion.

19. The hanger hinge of claim 1, wherein the adjusting tool comprises an Allen key.

20. The hanger hinge of claim 1, wherein the inner surface of the sleeve is provided with one or more projections that include the one or more locking member abutment surfaces.

* * * * *